Nov. 10, 1925.

B. M. PETERSON ET AL 1,560,722

AUTOMOBILE EXTRACTOR

Filed Feb. 2, 1925

Inventors
B. M. Peterson,
Henry W. Sears,
Edgar D. Peterson,
By
Clarence O'Brien
Attorney Patented Nov. 10, 1925.

1,560,722

UNITED STATES PATENT OFFICE.

RUDOLF M. PETERSON, HENRY W. SEARS, AND EDGAR D. PETERSON, OF KANORADO, KANSAS.

AUTOMOBILE EXTRACTOR.

Application filed February 2, 1925. Serial No. 6,290.

*To all whom it may concern:*

Be it known that we, RUDOLF M. PETERSON, HENRY W. SEARS, and EDGAR D. PETERSON, citizens of the United States, residing at Kanorado, in the county of Sherman and State of Kansas, have invented certain new and useful Improvements in Automobile Extractors, of which the following is a specification.

This invention relates to an improved device, which is especially, but not necessarily, adapted for use in connection with automobiles, for utilizing the power to operate the drum upon which an anchored cable is wound for extracting the vehicle from mud holes and the like.

The principal object is to provide a device of this class, which is in the form of an attachment, the same being constructed to permit it to be associated with the differential gearing, to permit the latter to function additionally for drivng the drum upon which the cable is wound.

Other objects, advantages, and features of the invention will become apparent from the following description and drawing.

In the accompanying drawing, forming a part of this application, and in which like numerals are employed to designate like parts throughout the same:

Figure 1:
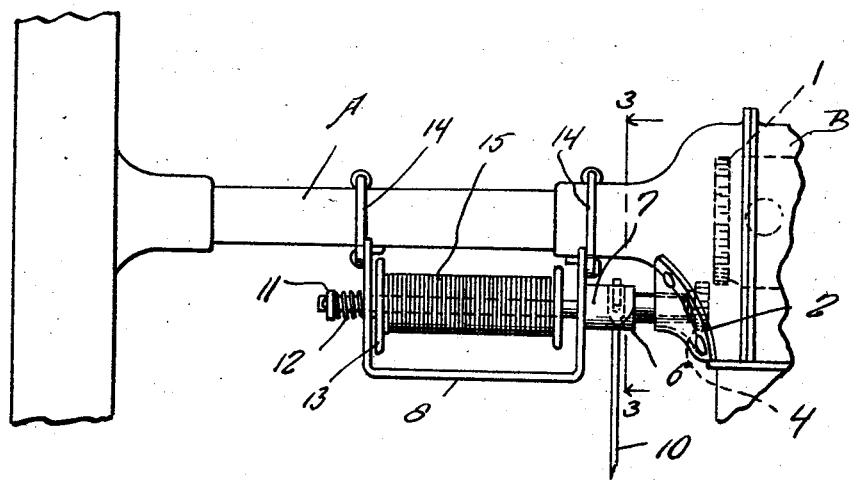
Figure 1 is a fragmentary view of the rear axle of a conventional form of automobile, showing an extracting device constructed in accordance with this invention applied thereto.
Figure 2:
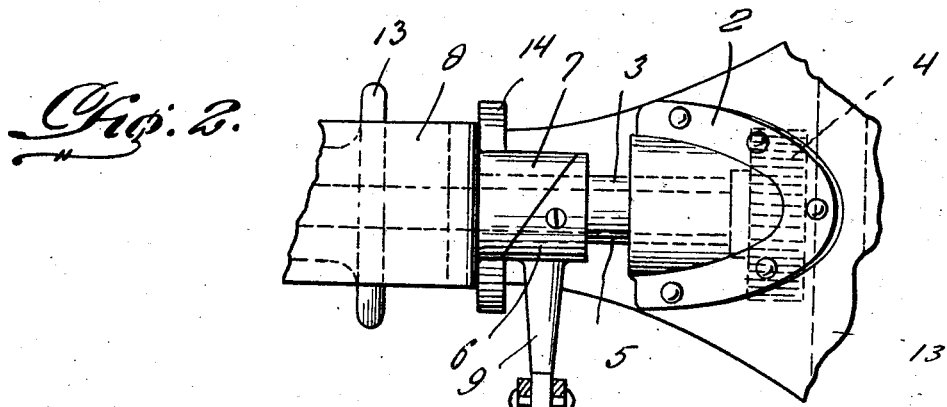
Figure 2 is an enlarged fragmentary elevational view, showing the construction and arrangement of details more particularly.
Figure 3:
Figure 3 is a sectional view, taken approximately upon the plane of the line 3—3 of Figure 1.

In the drawing, the reference character A designates a rear axle housing, at the inner end of which is a casing B, in which the usual differential gear (not shown) is housed. It is with this gearing that the improved device is associated.

In carrying out the present invention, we supply a relatively large gear 1 which is attached to one of the driven axle sections, and is confined within the differential casing. The casing is formed adjacent the gear with an opening over which an especially designed closing plate and bearing 2 is bolted or otherwise connected. Journaled for rotation in the bearing is a supplemental shaft 3, on the inner end of which is a relatively small pinion 4, adapted to mesh with the gear 1. The shaft 3 is rotatable in a sliding oscillatory sleeve 5, which is reciprocated under the action of the cam collar 6, which is fixed thereto, and which is adapted to cooperate with an extension bearing carried by the frame 8. The extension 7 has a bevelled end for cooperation with the correspondingly cut end of the collar 6. The member or collar 6 is provided with the depending crank arm with which an operating rod 10 is connected, this rod extending to an appropriate point within convenient reach of the operator to be controlled by him. It will be noted that the angularly directed ends of the frame are provided with bearing openings through which the shaft 3 extends. In fact, the shaft extends beyond the outermost end of the frame and the extended portion is provided with a washer 11 forming a shoulder, there being a coil spring interposed between this shoulder and the adjacent end of the frame. This spring serves to normally slide the shaft, sleeve 5, and cooperating details, in a direction from right to left, to normally maintain the pinion and gear disengaged. Fixedly mounted on that portion of the shaft confined within the frame is an appropriate drum 13, upon which a flexible cable or the like 15 is adapted to be wound. The frame is mounted upon the axle housing by suitable two part clamps 14. Under normal conditions, the spring 12, as before stated, serves to maintain the pinion 4 out of mesh with the gear 1. However, by exerting a forward pull upon the operating rod 10, to rock the crank arm 9, a cam action produced between the parts 6 and 7 serves to exert an endwise thrust upon the sleeve 5, thus sliding the shaft 3, over against the action of the spring 12, and bringing the pinion into mesh with the gear 1. As the gear is mounted upon a driven part, it is obvious that the shaft 3 will thus be set into rotation, to in turn rotate the drum 13 and wind the cable 14 thereon. The free end of the cable is, of course, secured to a stake or its equivalent, driven in the ground. Under the conditions, it is obvious that the winding of the cable upon the drum will serve to extract the vehicle from the mud hole or other surface upon which it is impossible to obtain the necessary traction.

It is thought that the foregoing description, taken in connection with the accompanying drawing, will enable persons skilled in the art to which the invention relates, to obtain a clear understanding of the same. For this reason, a more lengthy description is thought unnecessary.

Although we have shown and described the preferred embodiment of the invention, it is to be understood that minor changes coming within the field of invention claimed may be resorted to, if desired.

We claim:

1. In a structure of the class described, a gear adapted to be fixedly mounted upon a driven axle section of a vehicle, a supporting frame, means for mounting said frame upon an axle housing of the vehicle, a shaft rotatably and slidably mounted upon said frame, spring means in association with the frame and shaft for sliding the shaft in a predetermined direction, a cable drum fixedly mounted on said shaft, manually operated cam coacting means in association with the frame and shaft for sliding the shaft in an opposite direction, the inner end of said shaft being adapted to extend through and into the differential gearing casing, and a pinion on the inner end of said shaft adapted to be moved into mesh with said gear.

2. In a structure of the class described, a gear adapted to be fixedly mounted upon a driven part, a pinion adapted to mesh with said gear, a shaft upon which said pinion is mounted, said gear, pinion, and end portion of said shaft being adapted to be confined within a differential gear casing, the casing being formed with an opening, a closing plate for said opening, said plate having a bearing in which said shaft is rotatable, a slidable and oscillatory sleeve upon said shaft and extending through said bearing and resting at one end against said pinion, a collar carried by said sleeve, said collar having a cam edge and being provided with a depending crank arm, means for supporting said shaft from an axle housing, a tubular extension carried by said means, said shaft extending through said extension and the extension having a cam edge for coaction with the aforesaid cam edge, and a cable drum fixedly mounted upon said shaft.

3. A structure of the class described comprising a substantially U-shaped supporting frame, clamps carried by the angularly directed ends of the frame, said clamps being adapted to be mounted upon an axle housing, a tubular bearing extension carried by and projecting from one of the ends of said frame, said extension having a beveled cam edge at its outer end, the other end of said frame having a bearing opening, a shaft journaled for rotation and sliding in said bearing opening and bearing extension, spring means for sliding the shaft in a predetermined direction, a pinion fixed upon one end of the shaft, a sleeve surrounding said shaft and abutting the pinion at one end, said sleeve being adapted for sliding and rotation, a collar carried by said sleeve and having a beveled cam surface abutting the aforesaid cam edge, said sleeve extending into said extension, a closing plate provided with a bearing in which said sleeve is located, a depending crank arm carried by said collar, an operating rod connected with said crank arm, and a drum fixedly mounted upon said shaft and confined between the ends of the aforesaid frame.

In testimony whereof we affix our signatures.

BUDOLF M. PETERSON.
HENRY W. SEARS.
EDGAR D. PETERSON.